May 7, 1963 R. L. JAESCHKE 3,088,565
MULTIPLE-CLUTCH ELECTROMAGNETIC TORQUE DEVICES
Filed March 28, 1960 3 Sheets-Sheet 1

Ralph L. Jaeschke
Inventor.
Koenig and Pope
Attorneys.

May 7, 1963   R. L. JAESCHKE   3,088,565
MULTIPLE-CLUTCH ELECTROMAGNETIC TORQUE DEVICES
Filed March 28, 1960   3 Sheets-Sheet 2

Ralph L. Jaeschke,
Inventor,
Koenig and Pope,
Attorneys.

May 7, 1963 R. L. JAESCHKE 3,088,565
MULTIPLE-CLUTCH ELECTROMAGNETIC TORQUE DEVICES
Filed March 28, 1960 3 Sheets-Sheet 3

Ralph L. Jaeschke,
Inventors.
Koenig and Pope
Attorneys.

United States Patent Office 3,088,565
Patented May 7, 1963

3,088,565
MULTIPLE-CLUTCH ELECTROMAGNETIC
TORQUE DEVICES
Ralph L. Jaeschke, Kenosha, Wis., assignor to Eaton Manufacturing Company, Cleveland, Ohio, a corporation of Ohio
Filed Mar. 28, 1960, Ser. No. 17,814
11 Claims. (Cl. 192—48)

This invention relates to multiple-clutch electromagnetic torque devices, and more particularly to close-coupled dual-unit magnetic-particle clutches, slip couplings and the like.

Among the several objects of the invention may be noted the provision of improved multiple magnetic couplings and the like adapted more effectively than heretofore to avoid parasitic cross-over torque between close-coupled units; the provision of means of the class described which is operative not only under steady-state conditions of field excitation but also under transient conditions which occur during unsteady and variable states, as during switching or like control operations; and the provision of simple and reliable circuitry for the purpose. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated:

Corresponding reference characters indicate corresponding parts throughout the several views of the drawings.

Figure 1:
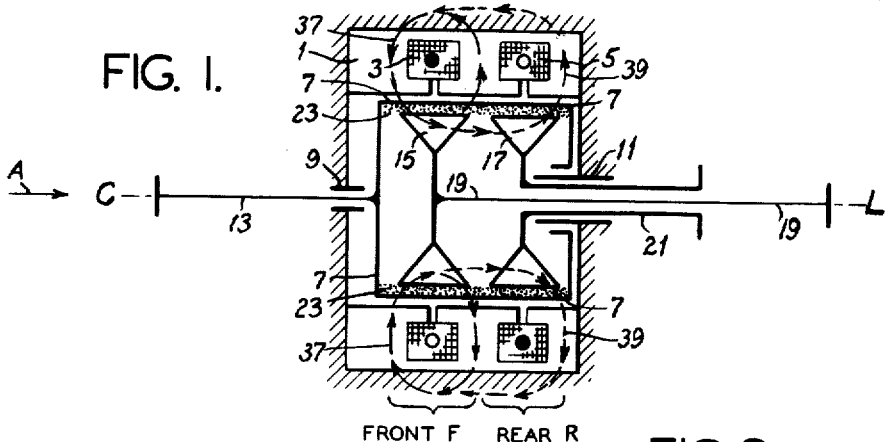
FIG. 1 is a diagrammatic view illustrating a close-coupled dual-unit clutch in connection with which (as an example) the invention is described.

In the development of two-unit magnetic-particle clutches such as shown in FIG. 1 and to the described below, it has been found that when one clutch is energized (excited electromagnetically) for engagement, the other clutch intended to be disengaged (deexcited electromagnetically) will actually be undesirably engaged (excited magnetically) to some degree, engendering therein an undesirable parasitic torque surge. This interaction is referred to as cross-over torque, which may amount from ½% to 1% of the normal clutch torque rating. It occurs because the two units, for compactness, are physically so closely positioned that parasitic leakage flux lines from one electrically excited clutch field coil link the other electrically deexcited clutch field coil and thus magnetically energize the other clutch to some extent.

It has been known that under steady-state conditions the cross-over torque between such clutch units can be eliminated by exciting the clutch intended to be disengaged with a suitable smaller current which engenders flux lines reverse to the potential leakage flux lines, thus cancelling them and eliminating the cross-over torque. This ratio of reverse-field current required in the disengaged clutch to that in the engaged clutch is generally in the range of about 10% to 20%. I have also found that the ratio of leakage to parent flux remains substantially constant, regardless of the degree of the parent flux. Hence in a given design the required current ratio should be maintained throughout any such changes of the parent flux as may occur under any conditions, including transient switching conditions and the like.

Figure 2:
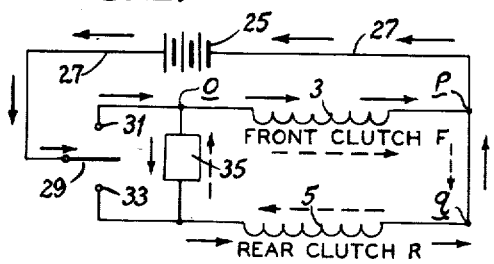
FIG. 2 is a diagram of a conventional and typical form of circuit heretofore used for exciting a close-coupled dual-unit clutch such as shown in FIG. 1.

The conventional means of applying reverse-field current has been through a so-called parallel connection between clutch field coils such as illustrated in FIG. 2 and to be discussed below. Such a conventional circuit performs satisfactorily for steady-state conditions of either of the clutches but produces undesirable torque surge effects under transient conditions of switching either clutch on or off. This is because under the old type of arrangement (FIG. 2) the time constants of the respective coil circuits were different, as I have discovered.

The object of the invention, therefore, is to construct a type of circuit (shown in FIGS. 3–5) which provides the same or nearly the same time constant for both clutch coils when excited at different current values, whereby current ratios in the coils will remain substantially the same under transient conditions as is the case under steady-state conditions. By making the time constants the same, the rates of current rise and decay in the two coils upon switching become substantially the same. Thus the desired condition is reached wherein the current ratios in the two clutch coils remain at substantially the same value, although the absolute values of the currents may change, to effect leakage flux cancellation constantly under transient conditions, as well as under steady-state conditions.

Referring now more particularly to FIG. 1, there is illustrated diagrammatically an example of a close-coupled dual-unit electromagnetic coupling or clutch to which the invention is applicable. Such a clutch is intended for selective output operation from a single input. The particular coupling shown by way of example is a dual-unit magnetic-particle clutch in which numeral 1 indicates a fixed cylindric magnetizable casing supporting adjacent annular exciter field coils 3 and 5. Within the casing 1 is a hollow cylindric magnetizable drum 7 rotatable on bearings 9 and 11. Drum 7 is connected with and adapted to be driven by an input drive shaft 13.

Within the drum 7 are located two rotatable magnetizable clutch cylinders or drums 15 and 17. Drum 15 is connected with an output shaft 19 and extends through a second hollow output shaft 21, the latter being connected with the drum 17. Shaft 21 passes through and is rotatably supported by the bearing 11, and shaft 19 is rotatably supported in shaft 21. Additional pilot bearings may be provided between parts such as 7, 19 and 21 but are not shown, being conventional.

In the cylindrical gaps between the inside of the drum 7 and the outsides of the drums 15 and 17 is carried a charge of finely divided magnetizable material 23 which may consist of powdered iron or the like with suitable additives, as known in the art. Appropriate labyrinth bearing seals are employed but not shown, also being known.

A typical former and conventional D.C. electrical circuit as heretofore employed for exciting the field coils 3 and 5 is shown in FIG. 2. This consists of a D.C. source 25 feeding a loop 27 in which the field coils 3 and 5 are parallel-connected through a double-throw, single-pole circuit-alternating switch 29. The switch contacts are shown at 31 and 33. A resistance 35 forms a cross-over connection between the parallel-connected coils 3 and 5. It has a value designed substantially to reduce the current in the coil 3 or coil 5 with which it is alternately connected in series by switch 29. In other words, either coil 3 or 5 with resistance 35 in series therewith, is in shunt or parallel-connection with the other coil 5 or 3, depending upon how switch 29 is thrown to make a connection.

The coils 3 and 5 have substantially equal numbers of loops or turns and are so wound with respect to the center line CL of the machine, and are so connected into the electrical loop 27, that the circular flows of current around the center line CL are opposite. This oppositely polarizes the coils along axis CL. Thus, for example, viewed along arrow A (FIG. 1) the current flow in coil 3 may be anti-clockwise and that in coil 5 clockwise. In coil 3, for example, flow down through the paper (positive to negative) is indicated by a white circle, and upward flow by a black dot. The significances of these circles and dots are converse if current flow be considered to be negative to positive.

Assuming a clockwise current flow (positive to negative), as viewed along arrow A, through coil 3, and employing the common right-hand rule, there is generated around coil 3 a toroidal flux field, directed as indicated by solid darts 37. This field interlinks parts of members 1, 7, 15 and the intervening material 23 around drum 15, hereinafter called the front clutch F. Therefore, and in known manner, the apparent shear strength of the affected material 23 is increased so as to transmit torque to shaft 19. An undesirable parasitical toroidal part of this toroidal field 37 (see dotted darts 39) interlinks around dead coil 5, and also interlinks parts of members 1, 7, 17 and intervening material 23 around drum 17, hereinafter called the rear clutch R. The apparent shear strength of the affected material 23 is increased so as to transmit cross-over torque to shaft 21. Such torque is parasitic and undesirable when it is desired to transmit torque only to shaft 19. The close proximity of the two coils and of the two drums 15 and 17 is responsible for this condition and accounts for the use of the term close-coupled in describing clutches F and R. The cross-over torque may be on the order of ½% to 1%, as above stated.

It will be understood that, generally speaking, it is desired to have only the engaged clutch transmit torque without cross-over torque being transmitted by the clutch intended to be disengaged.

If current is caused to flow positive to negative in the opposite or anticlockwise direction in coil 5, an oppositely polarized toroidal field is established, by means of which the interlinked dotted-line parasitical part 39 of the field 37 is bucked out substantially completely from the disengaged clutch. Thus since the parasitical part 39 of the field 37 is comparatively weak, it can be bucked out by smaller reverse-field current in coil 5, for example, 10% to 20% of that in coil 3. This is a reverse-field-forming current or the so-called reverse-field current. The reduced current is obtained by use of an appropriate resistance such as 35 (FIG. 2) adapted to be switched into series with either parallel-connected coil. Thus, for example, when switch 29 is thrown to contact 31, a current is established clockwise in coil 3 and a smaller current in the anticlockwise direction through coil 5 sufficient to form a reverse field, bucking out the parasitical field 39. By throwing switch 29 to contact 33, the roles of the coils 3 and 5 are reversed and torque is delivered from input shaft 13 to output shaft 21. Thus the purpose of this arrangement is to eliminate the parasitical magnetic field 39 around coil 5 when main field 37 is established around coil 3; and conversely, to eliminate the corresponding parasitic field around coil 3 when a main field is established around coil 5. However, the arrangement is successful only under steady-state conditions.

Under steady-state conditions, no time constants are controlling as regards the roles of the circuit elements, for example between $o$ and $p$ on the one hand, and between $o$ and $q$ on the other hand, when switch 29 is on contact 31. But under transient conditions, as when switch 29 is opened or closed on contact 31, the time constant, or the $L/R$ ratios, in these circuit portions $o—p$ and $o—q$ become a problem because of their difference. Hence at various instants during a transient switching event on contact 31, the desired ratio of clutch currents in portions $o—p$ and $o—q$ is not obtained. The result is that for a short interval upon opening and closing the switch 29 with respect to contact 31, the parasitic field is not bucked out and parasitic torque is transmitted by the clutch intended not to drive. When switch 29 is closed or opened relative to contact 33, similar conditions prevail, except that resistance 35 is then in series with coil 3 instead of coil 5. Thus although the FIG. 2 circuit is satisfactory for steady-state conditions, it is unsatisfactory under transient conditions of switch opening and closure. The significance in this connection of the solid and dotted arrows in FIG. 2 will be made clear below.

Figure 3:
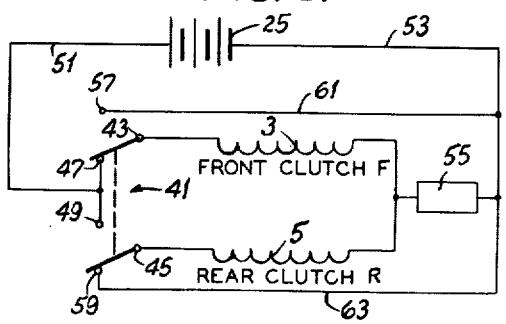
FIG. 3 is a diagram of an improved form of an electrical circuit constructed according to the invention for exciting the close-coupled dual-unit clutch shown in FIG. 1.

Referring to FIG. 3, one form of my new arrangement is illustrated. This consists of a D.C. current source 25 in a circuit containing a double-pole double-throw circuit-alternating switch 41. The poles of this switch 41 are shown at 43 and 45. Coil 3 is connected to pole 43 and coil 5 to pole 45, the switch being arranged to connect them together in series across the supply 25. Contacts 47 and 49 of the switch 41 are connected by line 51 with one side of the supply 25. The other side of the supply is connected by line 53 through a resistance 55 connected between coils 3 and 5. Contacts 57 and 59 of the switch 41 are connected by lines 61 and 63 with line 53. Coils 3 and 5 again have the same number of reverse current turns as in FIG. 1. By means of this arrangement, more current flows through the coil 3 when switch 41 is positioned as shown, because this current must feed coil 5 and resistance 55. Nevertheless, the $L/R$ ratio or time constants are the same or nearly the same and hence the rate of current rise or decay upon switching is substantially the same in each coil 3 and 5. In the opposite setting of switch 41, the larger current flows through coil 5. In either case the physical circular directions of flow around axis CL are opposite. The advantage of the circuit of FIG. 3 over the conventional circuit shown in FIG. 2 is that in the FIG. 3 form the time constants for the coils 3 and 5 are the same under transient switching conditions, whereas in the FIG. 2 form their time constants are different. Further significance of this will appear below.

Figure 4:
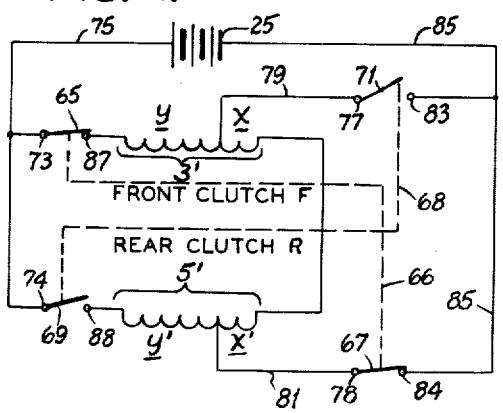
FIGS. 4 and 5 are diagrams of modified circuits made according to the invention.

In FIG. 4 is shown another arrangement by use of tapped coils for obtaining the desired identity of time constants in the clutches. In this case, 25 again indicates the D.C. supply and 3' and 5' the clutch coils. At 65 and 67 are shown single-pole, single-throw circuit-alternating switches interconnected to open and close simultaneously, as indicated by dotted lines 66. At 69 and 71 are additional single-pole, single-throw circuit-alternating switches, also connected to open and close simultaneously, as indicated by dotted lines 68. The poles 73 and 74 of the switches 65 and 69 are connected to one side of the D.C. source 25, as shown by connection 75. The poles 77 and 78 of switches 71 and 67 are tapped into the coils 3' and 5', as shown by connections 79 and 81, respectively. The tapped amounts $x$ and $x'$ of the coils are equal, leaving equal untapped amounts $y$ and $y'$. The contacts 83 and 84 of switches 71 and 67 have a common connection 85 with the other side of the supply 25. The ends of the coils 3' and 5', in their untapped parts $y$, $y'$ are connected to the contacts 87 and 88, respectively.

When the switches are positioned as shown in FIG. 4, current flows from the source 25 through all of coil 3' and in series through the tapped part $x'$ of coil 5'. In the opposite positions of these switches, current flows in series through all of coil 5' and in series through the tapped part $x$ of coil 3'. Again the time constants in the clutches F and R are the same according to either switch setting. The amount of tapping is the same for each coil and is sufficient to buck out the parasitical flux which otherwise causes cross-over torque. This form of the invention eliminates the need for a resistance such as 35 (FIG. 2) or 55 (FIG. 3).

Figure 5:
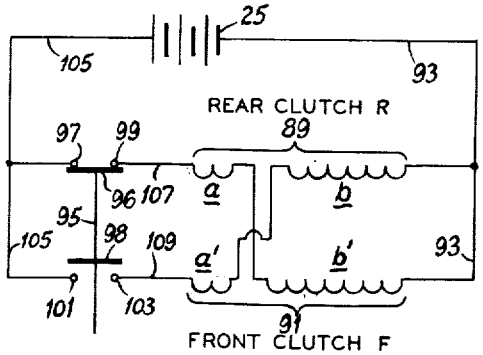

In FIG. 5 is shown an alternative form of the invention in which again numeral 25 indicates the D.C. power supply. In this case, special cross-connected composite split field coils are used, such as shown at 89 and 91. Coil 89 has split portions $a$ and $b$; coil 91 has split portions $a'$ and $b'$. The total number of loops in coil 89 equals the number of loops in coil 91. The number of loops in section $a$ equals the number in section $a'$. The number of loops in section $b$ equals the number in section $b'$. The number of loops in either section $a$ or $a'$ is sufficient to build up a reverse field which will buck out the parasitic field from either section $b$ or $b'$. Either section $b$ or $b'$ contains enough coils for clutch operation. Coil section $a$ is cross-connected with coil section $b'$, and coil section $a'$ is cross-connected with coil section $b$. Coils $b$ and $b'$ have a common connection 93 with the source 25.

At 95 is shown a circuit-alternating switch having two single-pole, single-throw components 96 and 98. Component 96 has contacts 97 and 99, which are closed when contacts 101 and 103 of component 98 thereof are open. Alternatively, contacts 101 and 103 are closed when contacts 97 and 99 are open. Contacts 97 and 101 have a common connection 105 with the supply 25. Contact 99 is connected with coil section $a$, as shown at 107. Contact 103 is connected with coil section $a'$, as shown at 109. Coil section $a$ is wound with magnetic field polarity opposite to that of coil section $b'$. Coil section $a'$ is wound with magnetic field polarity opposite to that of coil section $b$. This oppositely polarizes the magnetic fields between coils $a$ and $b'$ on the one hand, and between coils $a'$ and $b$ on the other hand. Since sections $a$ and $b'$ are in series, as well as $a'$ and $b$, the time constants of the two clutches F and R are the same for either switch setting. This form of the invention eliminates resistances and simplifies the switch arrangements.

In all forms of the invention, the controlling condition for cancelling leakage flux and therefore preventing cross-over torque is that the ampere turns in the clutch intended to be deexcited shall be less than the ampere turns in the excited clutch and of a number such that the leakage magnetic field from the excited clutch shall be cancelled.

Figure 6:
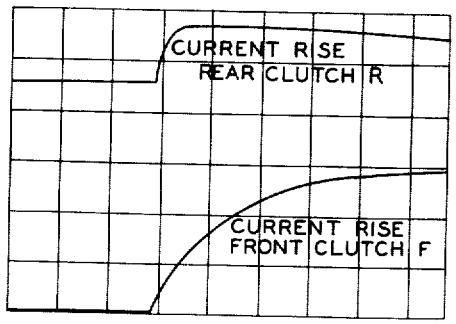
FIG. 6 is a chart illustrating typical rates of current rise under stationary conditions in close-coupled dual-unit clutches excited by means of a conventional circuit such as shown in FIG. 2.

Referring now to FIGS. 6–10, certain operative comparisons may be made between the operation of a conventional circuit such as shown in FIG. 2 and the new circuits such as shown in FIGS. 3–5. Thus in FIG. 6, illustrating functions of the FIG. 2 form, the lower trace represents current rise in the front clutch F when switch 29 is closed on contact 31. The upper trace represents current rise in the rear clutch R. These rises are plotted for conditions of closure of switch 29 when all shafts 13, 19 and 21 are stationary. Current in the front clutch F is about 10.5 amp. and in rear clutch R about 2.0 amp.

Figure 8:
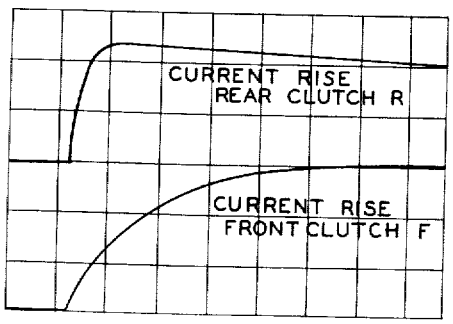
FIG. 8 is a chart similar to FIG. 6 for dynamic starting conditions.

In FIG. 8, the same currents are plotted for a condition in which switch 29 is closed on contact 31 when shaft 13 is rotating at 1,000 r.p.m. while shafts 19 and 21 are stationary. It will be seen that in both cases relating to the FIG. 2 arrangement, the rate of rise of current upon switch closure is quite different in the two clutches F and R.

Figure 10:
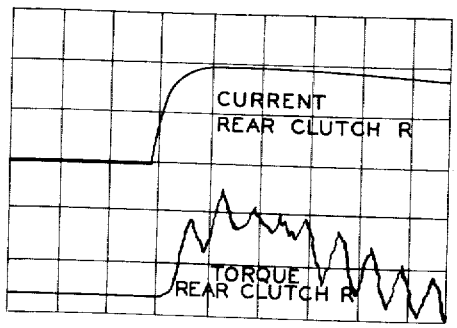
FIG. 10 is a chart illustrating current and torque characteristics under dynamic starting conditions of a conventional exciting circuit such as shown in FIG. 2.

The ultimate result of conditions pertaining to FIG. 8, for example, is shown in FIG. 10, which illustrates what occurs when switch 29 of FIG. 2 is placed on contact 31. The upper trace in FIG. 10 shows how the rear clutch current rises and the lower trace shows how at the same time the rear clutch torque temporarily surges as the switch 29 is closed. Thus this lower trace shows a surge of transient cross-over torque which the circuit of FIG. 2 is incapable of eliminating, despite the fact that it is capable of eliminating cross-over torque under steady-state conditions.

Figure 7:
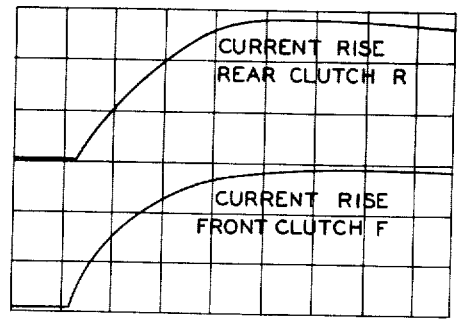
FIG. 7 is a chart comparable to FIG. 6, but showing typical rates of current rise under stationary conditions in dual clutches excited by a circuit constructed according to the invention.
Figure 9:
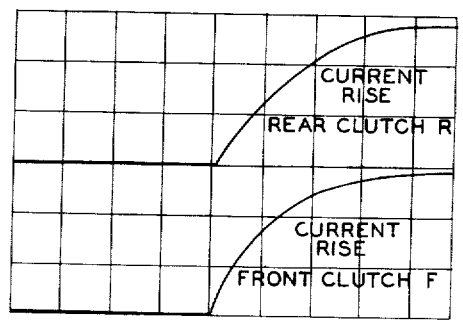
FIG. 9 is a chart similar to FIG. 7 but for dynamic starting conditions.
Figure 11:
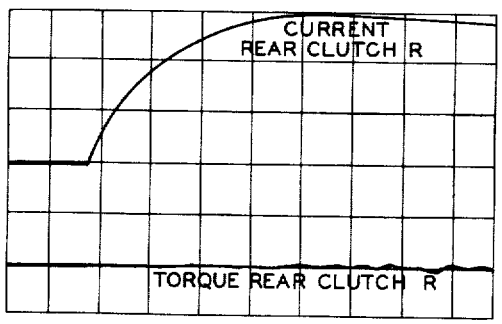
FIG. 11 is a chart illustrating current and torque characteristics under dynamic starting conditions of an exciting circuit constructed according to the invention.

FIGS. 7, 9 and 11 are comparable respectively with FIGS. 6, 8 and 10 and illustrate the typical improved operation of the invention, constructed according to circuits such as shown in FIGS. 3–5. It will be seen from FIGS. 7 and 9 that the traces for current rise in both the front and rear clutches F and R have been brought into closer, if not exact, parallelism. In other words, the rates of current rise in each of clutches R and F are the same to a much greater degree of approximation than in FIGS. 6 and 8 respectively. This produces reverse flux field lines at about the same rate that the normal parasitic flux lines 39 are produced and which therefore are more exactly cancelled.

FIG. 11, by comparison with FIG. 10, shows how the current relationships illustrated in FIG. 9 reduce the cross-over torque. The upper trace in FIG. 11 shows current rise in the rear clutch R. The lower trace shows how the comparatively large cross-over torque of FIG. 10 has been eliminated upon switch closure.

Figure 12:
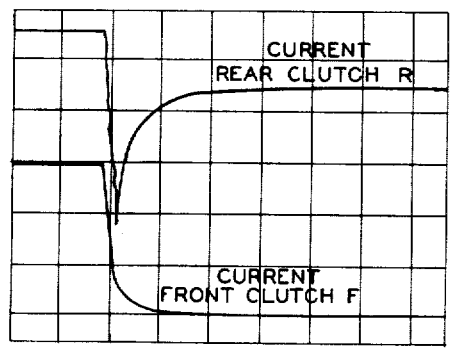
FIG. 12 is a chart illustrating certain field current relationships under dynamic conditions upon opening a conventional circuit such as shown in FIG. 2.

In FIG. 12, conditions are illustrated for the FIG. 2 type of circuit when switch 29 is opened with the input shaft 13 turning at 1,000 r.p.m. and the front output shaft 19 operating at 1,000 r.p.m., with drop from 10.5 amp. of excitation for the front clutch F. In FIG. 2 the solid arrows show direction of current flow when switch 29 is closed on contact 31. The dotted arrows show the direction of transient current flow when the switch is opened, which effects current reversal in the rear clutch R. The upper trace in FIG. 12 indicates the mode of current drop in the rear clutch R from about 2.0 amp. Assuming initially that switch 29 is on contact 31 and that the switch is opened, the front clutch current falls off rapidly, as shown in FIG. 12. The reverse current of the rear clutch R suddenly changes direction and then decays gradually. The result is two entirely different kinds and rates of current decays in the two clutches F and R.

Figure 13:
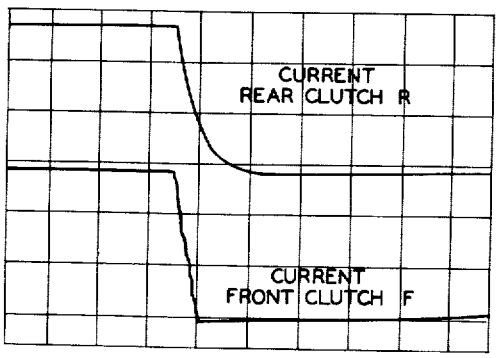
FIG. 13 is a chart illustrating certain field current relationships under dynamic conditions upon opening an improved circuit according to the invention.

FIG. 13 shows comparable traces for switch opening in a circuit made according to the invention. In this case the slope of the fall-off of the rear clutch R current more closely follows that of the front clutch F, without the stated reversing condition shown in FIGS. 2 and 12 for current fall-off in the rear clutch R.

Figure 14:
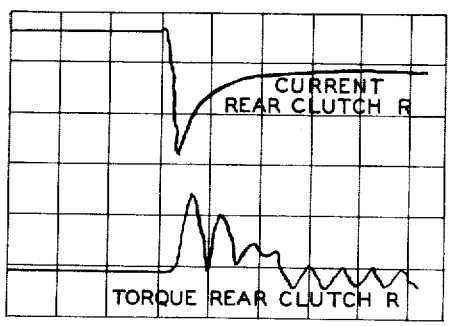
FIG. 14 is a chart illustrating certain current and torque characteristics under the FIG. 12 conditions; and, FIG. 15 is a chart illustrating certain current and torque characteristics under the FIG. 13 conditions.

In FIG. 14 the upper trace shows a reverse-field decay current for a rear clutch current from only about 1.1 amp. when the switch 29 (FIG. 2) is opened. In this case the front clutch current is also about 10.5 amp., as in FIG. 12. The resulting transient rear clutch torque surge occurs as shown by the lower trace in FIG. 14. For a rear clutch current value of 2 amp. as in FIG. 12, the cross-over torque in FIG. 14 would be even more.

Figure 15:
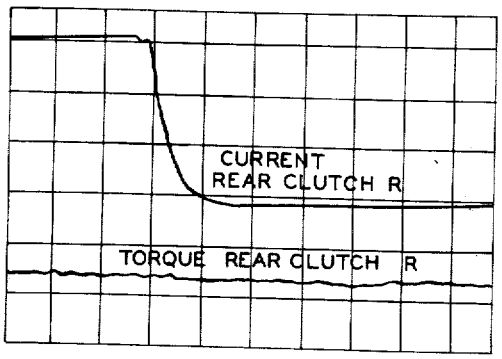

In FIG. 15, relating to the new arrangement, the upper trace shows a rear clutch reverse-field current decay curve from about 2.0 amp., where the front clutch current is about 10.5 amp. The lower trace in FIG. 15 shows how the torque of the rear clutch R is comparatively unaffected when the circuit is opened.

It is to be understood in connection with FIGS. 6–15 that the basic results shown were obtained from oscillographs both for the conventional arrangement of FIG. 2, and for the improved arrangement according to a circuit as shown in FIG. 3. The graphs as drawn show averages where oscillograph traces were in effect wider than the ink line used in drawing. Comparable results would be obtained from the alternative circuits such as shown in FIGS. 4 and 5.

Summarizing, it has been shown that transient conditions exist when a close-coupled two-unit magnetic-particle clutch such as shown in FIG. 1 is turned on and off, using either parallel-connected clutch coils (FIG. 2) or series clutch coils (FIGS. 3–5). The parallel type of connection is satisfactory for steady-state conditions but is undesirable under transient switching conditions, since any substantial torque surges cannot be tolerated under any conditions. The series type connection such as shown in FIGS. 3–5 produces no undesirable cross-over torque effects of any consequence either for steady-state or transient (switching) conditions.

While dual-unit magnetic-particle oppositely polarized clutches have been described in particular, it will be understood that the invention is also applicable to any analogous multi-unit electromagnetic device in which oppositely polarized close field coils must be connected together in the same electrical system for selective excitation and the time constant made equal for all. The invention is applicable to various torque devices such as electric brakes, dynamometers and the like, as well as electric couplings or clutches.

The circuits illustrated in FIGS. 2–5 show no governor speed controls or regulators for the speeds of the output shafts 19 and 21. Such regulators are not usually employed in connection with magnetic-particle clutches but they are often employed when the clutches are of the eddy-current slip type, and it is to be understood that their use is not precluded when required.

It is pointed out that opposite magnetic field polarities of coils such as 3, 5, etc. may be obtained in various ways. The general requirement is that the coils that are to be magnetically bucked shall be so wound and their voltage-polarized terminals so connected in the electrical circuit that the magnetic field of one of the coils will oppose that of the other along axis CL. This is what is meant herein by opposite field polarization of the coils 3 or 5. This opposite field polarization may be accomplished, insofar as the relationship between the electrical connections and the winding directions of the coils are concerned, either by physically winding the coils in the same or opposite directions, but in either case so connecting the coil terminals that their voltage polarities will cause the circular directions of current flows through their loops to be opposite.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Electromagnetic clutch apparatus comprising at least two oppositely magnetically polarized field coil windings adapted to be electrically excited from terminals of a power source and which are so closely located as to be subject to mutual magnetic field interlinkage by leakage flux if only one winding is excited, a control circuit including at least a portion of one of said field coil windings and at least a portion of the other of said field coil windings, said control circuit including conductive connections and switch means adapted to connect said portions for current flow therethrough in series circuit relation between said terminals, and control means including a resistor adapted to produce a number of ampere turns in either field coil winding which are substantially different and less than the number of ampere turns in the other field coil winding and of a value which will produce a magnetic field substantially equal in magnitude and opposite in polarity to that of the leakage flux from said other field coil winding, said switch means adapted in a first position to connect one of said winding portions in series with the other winding portion and to shunt said resistor across said other winding portion, and adapted in a second position to connect said other winding portion in series with said one winding portion and to shunt said resistor across said one winding portion, whereby the effect of leakage flux as to either winding may be substantially cancelled.

2. An excitation circuit for multi-unit electromagnetic clutches and the like having oppositely polarized field coil winding units therein which are so closely located as to be subject to mutual interlinkage by leakage flux if one only is excited; comprising a voltage source, at least one common connecting means between first winding portions in said units and with one side of the source, connecting and switch means adapted alternately to connect second winding portions of the units with the other side of the source and respectively in series circuit relation with said first winding portions, whereby at least said portions of the coil winding units are connected in series circuit relation across said voltage source when current flows, and conductive means in the circuit adapted in either position of the switch means to determine different numbers of ampere turns supplied by one and the other of said coil winding units when said portions thereof are serially connected, the number of ampere turns in one of said coil winding units being less than the number of turns in the other coil winding unit and of a value which will produce a magnetic field substantially equal in magnitude and opposite in polarity to that of the leakage flux from that of said other winding coil unit, the numbers of windings in said units being substantially equal and said conductive means including a resistance joining said common connecting means with said one side of the source.

3. In a multi-unit electromagnetic clutch constructed alternately to serve several outputs from an input, wherein each unit contains an annular magnetic field coil and an annular magnetizable member, said coils and members extending around and being adjacently located on a common axis, said coils having an equal number of physical turns, each coil being adapted under individual excitation to magnetize one of the members associated therewith with resultant application of torque thereto from the input, each of said members being subject to parasitic magnetization that might in its unit develop from the magnetic field of the coil in the adjacent unit; the improvement comprising an exciter circuit containing a voltage source, portions of the circuit being constituted by at least parts of the coils in the respective units, connections and switch means adapted alternately and serially to connect pairs of said parts electrically across the voltage source for serial flow of current through said serially connected pairs when excited, said coil parts being respectively so wound around said axis that their magnetic fields will be oppositely polarized along said axis by such current as flows serially through serially connected coil parts, said switch means in the circuit adapted alternately to connect and disconnect current to and from said serially connected circuit parts, and control means connected in the circuit adapted to determine the number of ampere turns in said serially connected circuit parts respectively when connected by said switch, the number of ampere turns in one coil being of such a value which will produce a magnetic field substantially equal in magnitude to that of the parasitic magnetization developed from the magnetic field of the coil in the adjacent unit, said control means including a resistance connecting the voltage source with the serial connection between coil parts.

4. Electromagnetic coupling apparatus for selectively coupling first and second driven members to a rotating driving member, said coupling apparatus comprising a first drum secured to said driving member for rotation therewith, second and third drums secured respectively to said first and second driven members for rotation therewith, said second and third drums being positioned with respect to said first drum to form magnetic gaps of substantially constant dimensions between said first and second drums and between first and third drums, a first field coil winding associated with said second drum adapted when energized to magnetically couple said first drum to said second drum, a second field coil winding associated with said third drum adapted when energized to magnetically couple said first drum to said third drum, said field coil windings being so closely located as to be subject to mutual magnetic field interlinkage by leakage flux if only one winding is energized, an electric power source, an electrical circuit including at least a portion of one of said field coil windings and at least a portion of the other of said field coil windings, and control means for producing a number of ampere turns in either field coil winding which is substantially less than the number of ampere turns in the other field coil winding and of a value which produces a magnetic field across one of said magnetic gaps substantially equal in magnitude and opposite in polarity to that of the leakage flux from said other field coil winding across said one gap, said control means being adapted to connect said portions in series across said power source whereby the rate of current rise in each of said portions is substantially equal.

5. Electromagnetic coupling apparatus as set forth in claim 4 wherein a charge of finely divided magnetizable material is carried in said magnetic gaps between said first and second drums and between said first and third drums.

6. Electromagnetic coupling apparatus as set forth in claim 4 wherein said control means includes a resistor and switch means connecting said first and second field coil windings in series across said power source, said switch means being adapted in a first position to connect said resistor in shunt across said first winding and in series with said second winding, and in a second position to connect said resistor in shunt across said second winding and in series with said first winding.

7. Electromagnetic coupling apparatus as set forth in claim 4 wherein said control means includes a switch adapted in a first position to connect said first field coil winding in series with a portion of said second field coil winding, and adapted in a second position to connect said second field coil winding in series with a portion of said first field coil winding.

8. Electromagnetic coupling apparatus as set forth in claim 4 wherein said control means includes a switch adapted in a first position to connect a major portion of said first field coil winding in series with a minor portion of said second field coil winding, and adapted in a second position to connect a major portion of said second field coil winding in series with a minor portion of said first field coil winding.

9. A two-unit clutch comprising adjacent electromagnetic first and second units having a common drive means and individual selectively connectible driven means, each of said units having a magnetizable rotor and an annular exciter field coil, all of which are adjacently located around a common axis, the exciter field coil of either unit when electrically excited adapted to produce a toroidal flux field interlinking it with its rotor and tending to generate leakage flux interlinking with the other winding means and its rotor, said coils in the respective units being wound for opposite current flows around said axis, an exciter circuit containing a voltage source, said coils forming a part of said circuit wherein they are serially connected when excited, a resistance joining the connection between coils with one side of said source, and a switch adapted to be connected alternatively with the serially connected coils, the contacts of said switch being connected in pairs with opposite sides of said source, whereby said coils may be serially connected across the source for applications thereto of reverse voltages and different currents therein respectively.

10. Apparatus for exciting two adjacent field coil windings which are so closely located as to be subject to mutual magnetic field interlinkage by leakage flux if only one winding is excited, comprising a voltage source, a resistor, and switch means connecting said windings in series across said voltage source, said switch means being adapted in a first position to connect said resistor in shunt across one of said windings and in series with the other of said windings, and in a second position to connect said resistor in shunt across said other winding and in series with said one winding.

11. Apparatus as set forth in claim 10 wherein said field coil windings are oppositely magnetically polarized field coil windings of an electromagnetic clutch, and wherein said switch means in said first position the current through said one winding produces a magnetic field substantially equal in magnitude and opposite in polarity to that of the leakage flux from said other field coil winding, and with said switch means in said second position, the current through said other winding produces a magnetic field equal in magnitude and opposite in polarity to that of the leakage flux from said one field winding.

References Cited in the file of this patent

UNITED STATES PATENTS

| 845,126 | Saville | Feb. 26, 1907 |
| 2,872,002 | Blaum | Feb. 3, 1959 |

FOREIGN PATENTS

| 187,399 | Germany | June 10, 1907 |

OTHER REFERENCES

German application, 1,047,543, printed December 24, 1958 (Kl 47c 14).

UNITED STATES PATENT OFFICE
CERTIFICATE OF CORRECTION

Patent No. 3,088,565

May 7, 1963

Ralph L. Jaeschke

It is hereby certified that error appears in the above numbered patent requiring correction and that the said Letters Patent should read as corrected below.

Column 2, line 26, for "This" read -- The --; column 10, line 44, after "wherein" insert -- with --.

Signed and sealed this 3rd day of December 1963.

(SEAL)
Attest:

ERNEST W. SWIDER
Attesting Officer

EDWIN L. REYNOLDS

Acting Commissioner of Patents